R. HUBERT.
ROBE HOLDER.
APPLICATION FILED APR. 11, 1918.
1,355,604.                                     Patented Oct. 12, 1920.
2 SHEETS—SHEET 1.
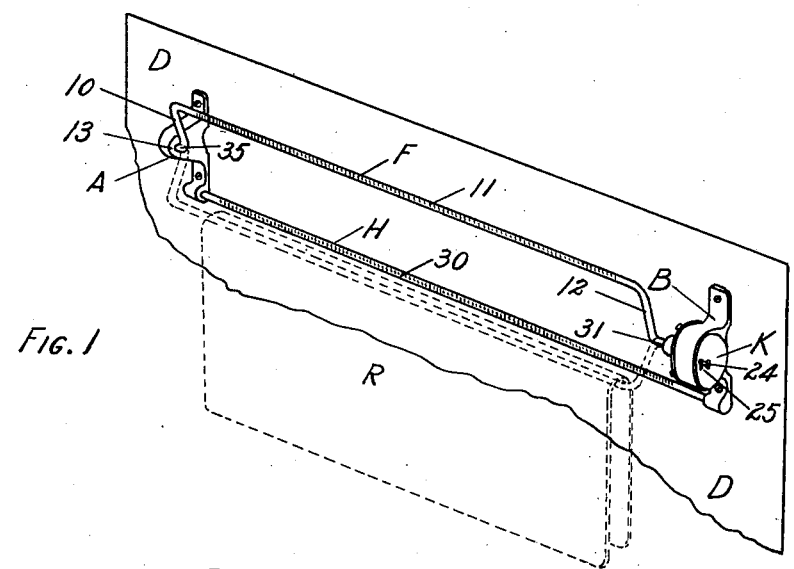
Fig. 1
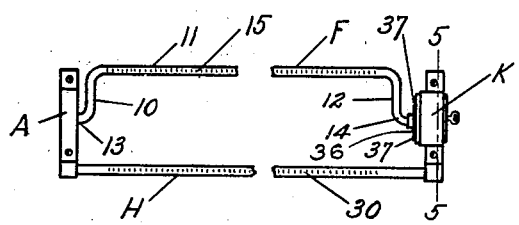
Fig. 2
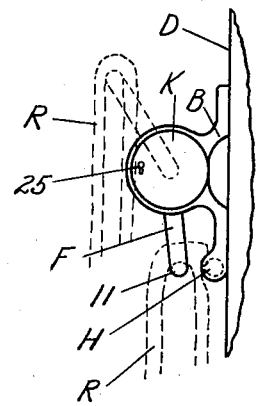
Fig. 3
Fig. 4
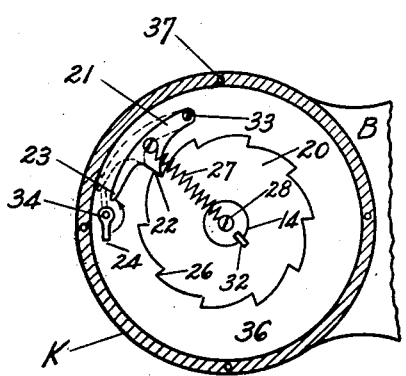
Fig. 5
Inventor
Romer Hubert
by Gardner A. Green
attorney

R. HUBERT.
ROBE HOLDER.
APPLICATION FILED APR. 11, 1918.

1,355,604.

Patented Oct. 12, 1920.
2 SHEETS—SHEET 2.

Inventor
Romeo Hubert
by Gardner D. Pearson
attorney

UNITED STATES PATENT OFFICE.

ROMEO HUBERT, OF LOWELL, MASSACHUSETTS.

ROBE-HOLDER.

1,355,604.  Specification of Letters Patent.  Patented Oct. 12, 1920.

Application filed April 11, 1918. Serial No. 227,969.

*To all whom it may concern:*

Be it known that I, ROMEO HUBERT, of Lowell, in the county of Middlesex and State of Massachusetts, have invented certain new and useful Improvements in Robe-Holders, of which the following is a specification.

This invention relates to holders or racks for supporting robes or garments above the floor or ground. It is particularly adapted for use in holding robes in automobiles or carriages but it may be used in connection with the seats of a theater or in checkrooms and similar places.

My purpose is to provide a neat, simple, compact, and easily operated supporting bar or rod over which a robe or garment, of any thickness within reasonable limits, can be thrown and can then be locked in position so that no one can remove it unless he has the appropriate key.

My device in general includes a relatively stationary member which may be the back of an automobile seat, a wall, or a bar or pins attached thereto, together with brackets, and a swinging bar having side arms which terminate in trunnions revoluble in bearings in such brackets, and also suitable means associated with one of the brackets, and the trunnion supported thereby, comprising suitable locking mechanism which may be arranged to automatically lock the parts as the swinging bar approaches the stationary member and which can only be released by the use of a suitable removable key.

The device may be arranged so that it can be locked in any position, but in my preferred form, after a garment has been placed on the swinging bar and the bar pushed down, it automatically locks and can only be released by the use of a key. Preferably the locking is done at the pivot point, and the locking means is so arranged that the swinging robe-supporting bar can be locked in any one of various positions so as to accommodate and lock robes of different thicknesses.

Figure 10:
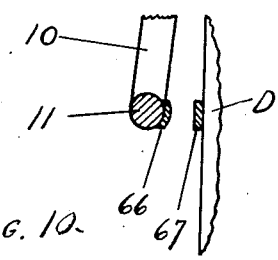
Figure 11:
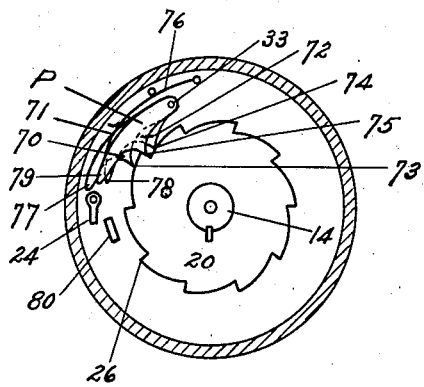
Figure 12:
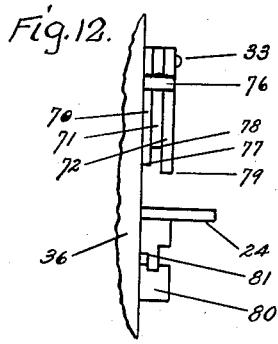
Figure 6:
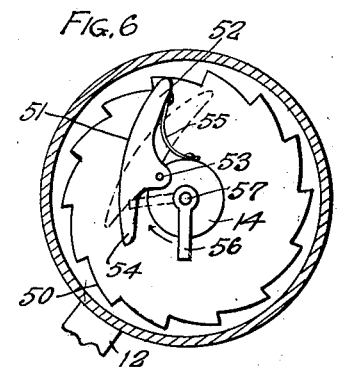
Figure 7:
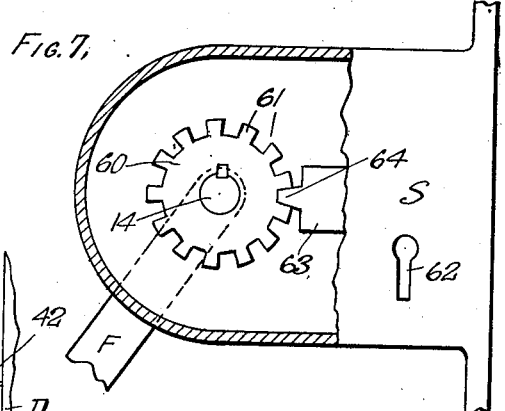
Figure 8:
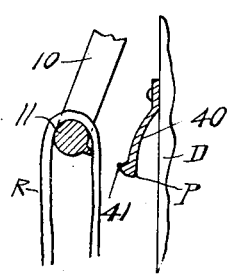
Figure 9:
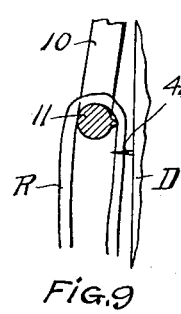

In the drawings, Figure 1 is a perspective view of my device in position to receive a robe. Fig. 2 is a front elevation of the same. Fig. 3 is an elevation from the right of Fig. 2, but with the swinging bar down and a robe locked in place. Fig. 4 is a view similar to Fig. 3 of a modification. Fig. 5 is a sectional elevation from the right of line 5—5 of Fig. 2. Fig. 6 is a view similar to Fig. 5 showing a modified form of pawl and ratchet. Fig. 7 is a view similar to Fig. 5 of another modification of my locking means. Figs. 8, 9, 10 are detail views showing modifications of the stationary member and attachments. Figs. 11 and 12 show a pawl made in sections.

D represents a relatively stationary member shown as the back of the front seat of an automobile. It presents a substantially straight plane, vertical surface, and fixed to it are the brackets A and B in which are bearings 35 and 31.

As shown in Figs. 1, 2, and 3, a bar H having teeth 30 is fixed between the brackets at the lower part, as this is a convenient way of attaching it, but this tooth-bar H forms part of the stationary member and, as will be explained, may be omitted.

F represents a swinging member which includes a swinging bar 11 carried by side arms 10 and 12 which terminate in trunnions 13 and 14 revoluble respectively in bearings 35 and 31 in brackets A and B. In the drawings, supporting arms 10 and 12 are shown as integral with bar 11, and trunnions 13 and 14 are shown as bent outwardly therefrom. Preferably bar 11 has teeth 15 and is so placed that, when swung downward, its teeth engage or come proximate to teeth 30 or to the bar H.

The trunnion 14 extends through plate 36 forming part of bracket B, and fixed thereto by means of a key 32 is a ratchet 20. Pivoted at 33 on bracket B is a pawl 21 having a detent 22 adapted to engage the teeth 26 in ratchet 20, and a tail 23 so located with reference to a key-post, such as 34, that when key 24 is inserted and turned toward the right to the dotted line position, it will raise pawl 21 so that its tooth 22 will clear the teeth on ratchet 20.

I may depend on gravity to cause pawl 21 and its tooth 22 to normally engage the teeth 26 of ratchet 20, but I prefer to use a tension spring 27 attached to a pin 28 at the center of the trunnion and the ratchet, on the end of trunnion 14 and connected at its other end to pawl 21.

Figs. 1, 2, 3, 4, and 5, show bracket B formed with a cylindrical casing portion K through which is a key-hole 25 for key 24 and a plate 36, which has bearing 31, through which trunnion 14 passes, fastened to K by screws 37. Plate 36 and casing K, however, are all part of bracket B.

Teeth 26 and ratchet 20 are shown as pitching to the right and of sufficient number so that when a robe R, shown in dotted lines in Fig. 1, is thrown over swinging bar 11 and it is brought down from the dotted line position to the full line position shown in Fig. 3, a slight pressure of the hand on bar 11 will cause it to squeeze the robe up against bar H or up against the flat wall D, as shown in Fig. 4, and as pawl 21 prevents it from moving away therefrom, the robe is firmly held until a removable key, like 24, is used to disengage the ratchet and pawl.

I prefer to use teeth, such as 30 and 15, which bite into the fabric of the robe and make it impossible to remove it without tearing, or strips of friction material, such as rubber, 66 and 67 as shown in Fig. 11.

Such teeth, strips, or the pins 42, fixed to the stationary member or to the swinging bar or to both serve as means to prevent a robe from slipping.

The stationary member may be the bare wall D, as shown in Fig. 4, or, as shown in Figs. 9 and 10, I may substitute for fixed bar H the bar P which is carried by slightly resilient supports, such as 40, fixed to wall D and having teeth 41, or I may use pins, such as 42, driven into wall D so as to penetrate robe R when it is forced against them by swinging bar 11, or I may use a strip 67.

In Fig. 6, I show interior ratchet teeth 50 cut in the inside of casing K, and I show a pawl 51 having a nose 52 to engage teeth 50 and pivoted at 53 to the end of trunnion 14. Pawl 51 has a tail 54 and is kept in engagement by a spring 55.

The parts are so arranged that when a key, such as 56, is inserted through a suitable key-hole in casing K, not shown, preferably on a key-post 57 which projects from the axis of 14, and is turned to the left to the dotted line position, pawl 51 is disengaged, and the continued movement of the key in the direction of the arrow turns up the bar 11 as the teeth of the pawl clear those on the interior ratchet, and the movement of nose 52 is limited when key 56 is stopped by pivot pin 53.

As shown in Fig. 7, I may use in place of ratchet teeth a member 60 with gear teeth 61 fixed to 14, and I may use an ordinary lock S having a key-hole 62 and a direct acting bolt 63 which may have a nose 64 of a size to enter between two teeth 61 whereby the swinging bar can be locked in any desired position.

As shown in Fig. 10, I may attach a strip of rubber 66 to bar 11 and another coöperating strip 67 to stationary member D.

In Fig. 11, I show in connection with trunnion 14 and ratchet 20, a pawl P made up of sections 70, 71, and 72, all pivoted loosely at 33 and having each a detent such as 73, 74, or 75, arranged at such positions as will split up the distance between teeth 26 whereby the bar 11 will be locked by any one of these detents dropping behind a tooth 26. By this arrangement, the teeth 26 need not be made as fine. A spring such as 76 may serve to keep the sections of pawl P from being kicked out of the way by any quick movement of ratchet 20. Fig. 12 is an elevation from the left of Fig. 11.

With this construction, by altering the length of their tails 77, 78, 79, these pawl sections can serve as lock tumblers for a key such as 24, which is so cut at 81 as to engage them.

Of course, any of the usual stops such as 80 may be fixed to the casing to prevent any but the right key from being used.

In my preferred form of device wherein a ratchet and pawl, such as shown in Figs. 5, 6, and 11, are used, my robe holder locks itself in place by gravity or by a very slight extra pressure from the hand.

For the operation of my device, the side arms, such as 10 and 12, must be rigid and not elastic or flexible, and they are preferably relatively short, while the swinging bar, such as 11, may be relatively long but should be rigid, while the connections between it and the side arms and the trunnions should also be rigid.

I claim:

1. In a robe holder, the combination of a relatively stationary member including a horizontal toothed bar, with brackets fixed to the stationary member proximate the ends thereof having alined horizontal bearings, a rigid swinging bar having teeth adapted to engage the toothed bar, relatively short, rigid side arms therefor and fixed thereto which terminate in trunnions revoluble in said bearings, a ratchet carried by one trunnion, and a pawl in operative relation therewith carried by its supporting bracket, of such form and so placed that it can be disengaged from the ratchet by a removable key.

2. In a robe holder, the combination of a relatively stationary member including a horizontal toothed bar, with brackets fixed to the stationary member having alined horizontal bearings, a rigid swinging bar having teeth adapted to engage the toothed bar, relatively short, rigid side arms therefor rigidly fixed thereto and which terminate in trunnions revoluble in said bearings, and means including a ratchet and pawl associated with one bracket and one trunnion to permit movement of the swinging bar toward the toothed bar and to prevent movement away therefrom except when a removable key is used to disengage the ratchet and pawl.

3. In a robe holder, the combination of a relatively stationary member including a horizontal toothed bar, with brackets fixed to the stationary member having alined horizontal bearings, a rigid swinging bar having teeth adapted to engage the toothed bar, relatively short, rigid side arms therefor rigidly fixed thereto and which terminate in trunnions revoluble in said bearings, and means including a ratchet fixed to one trunnion, and a plurality of pawls pivoted to one bracket in association with such ratchet adapted to successively engage adjoining teeth of the ratchet, whereby movement of the swinging bar toward the toothed bar is permitted and movement away therefrom is prevented, except when a removable key is used to disengage the pawls from the ratchet.

In testimony whereof I have affixed my signature.

ROMEO HUBERT.